United States Patent
Korolev et al.

(10) Patent No.: US 7,079,737 B1
(45) Date of Patent: *Jul. 18, 2006

(54) DEVICES AND METHODS FOR DYNAMIC DISPERSION COMPENSATION

(75) Inventors: Andrey E Korolev, St. Peterburg (RU); Dominique Labilloy, Paris (FR); Daniel A Nolan, Corning, NY (US); Vasiliy Solovjev, Saint-Petersburg (RU)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/683,055

(22) Filed: Oct. 10, 2003

Related U.S. Application Data

(60) Provisional application No. 60/418,080, filed on Oct. 11, 2002.

(51) Int. Cl.
*G02B 6/02* (2006.01)
*G02B 6/16* (2006.01)
*H01S 3/00* (2006.01)

(52) U.S. Cl. ............... 385/123; 385/124; 385/122; 385/1; 398/81; 359/341.1; 359/337.5; 359/338

(58) Field of Classification Search ............ 385/5, 385/122–124, 126, 127, 147, 27, 1, 2, 3, 385/141; 398/81, 148; 359/333, 337.5, 359/341.1, 338, 341.2
See application file for complete search history.

(56) References Cited

U.S. PATENT DOCUMENTS

| | | | |
|---|---|---|---|
| 5,878,182 A | 3/1999 | Peckham | 385/123 |
| 6,108,474 A * | 8/2000 | Eggleton et al. | 385/122 |
| 6,404,964 B1 | 6/2002 | Bhagavatula et al. | 385/123 |
| 6,430,346 B1 * | 8/2002 | Conradi et al. | 385/123 |
| 6,556,744 B1 * | 4/2003 | Brimacombe et al. | 385/24 |
| 6,574,405 B1 * | 6/2003 | Mukasa | 385/123 |
| 6,614,973 B1 | 9/2003 | de Montmorillon et al. | 385/123 |
| 6,636,677 B1 | 10/2003 | Hasegawa et al. | 385/127 |
| 6,661,958 B1 * | 12/2003 | Hirano et al. | 385/127 |
| 6,754,420 B1 * | 6/2004 | Tsuritani et al. | 385/123 |
| 6,865,328 B1 * | 3/2005 | Berkey et al. | 385/123 |
| 2002/0076186 A1 | 6/2002 | de Montmorillon et al. | 385/123 |
| 2002/0131160 A1* | 9/2002 | McNicol | 359/337.5 |
| 2004/0071419 A1* | 4/2004 | Berkey et al. | 385/123 |
| 2004/0184815 A1* | 9/2004 | Korolev et al. | 398/148 |

FOREIGN PATENT DOCUMENTS

| | | |
|---|---|---|
| EP | 0685947 A1 | 6/1995 |
| EP | 0971495 A2 | 12/2000 |

* cited by examiner

*Primary Examiner*—Brian M. Healy
(74) *Attorney, Agent, or Firm*—Svetlana Z. Short

(57) ABSTRACT

The present invention provides devices and methods for dispersion compensation. According to one embodiment of the invention, a dispersion compensating device includes a negative dispersion fiber having an input configured to receive the optical signal, the negative dispersion fiber having a length and dispersion sufficient to remove any positive chirp from each wavelength channel of the optical signal, thereby outputting a negatively chirped optical signal; an amplifying device configured to amplify the negatively chirped optical signal; and a nonlinear positive dispersion fiber configured to receive the negatively chirped optical signal. The devices of the present invention provide broadband compensation for a systems having a wide range of variable residual dispersions.

21 Claims, 13 Drawing Sheets

DEVICES AND METHODS FOR DYNAMIC DISPERSION COMPENSATION

CROSS-REFERENCE TO RELATED APPLICATIONS

This application claims the benefit of priority of U.S. Provisional Application Ser. No. 60/418,080 filed on Oct. 11, 2002, which is incorporated by reference herein in its entirety.

BACKGROUND OF THE INVENTION

1. Field of the Invention

The present invention relates generally to optical communications, and more specifically to devices and methods providing dispersion compensation of an optical signal.

2. Technical Background

As the bit rates of optical communications systems increase, the deleterious effects of dispersion in the optical fibers used in long-distance transmission become increasingly important. Dispersion causes an optical pulse to spread out in time; the longer wavelength components of the pulse travel along the fiber at a different rate than do the shorter wavelength components of the pulse. Typically, long-distance transmission fibers (e.g. LEAF®, available from Corning Incorporated of Corning, N.Y.) have a small but non-negligible positive dispersion, causing the shorter wavelength components to arrive at a network node before the longer wavelength components. Such a pulse is said to be positively chirped. This temporal spreading can cause loss of signal fidelity and an increase in bit error rate.

Conventional methods of dispersion compensation use dispersion compensating fiber to reverse the effects of dispersion in the transmission fiber. Dispersion compensating fiber typically has a large negative dispersion to counteract the positive dispersion of the transmission fiber. In one type of conventional dispersion compensating device, a dispersion compensating fiber is packaged on a spool in a module. The length and dispersion properties of the dispersion compensating fiber are chosen to balance the dispersion of the span of transmission fiber to which it is coupled. A positively chirped optical signal from the transmission fiber is propagated through the dispersion compensating fiber, and the negative dispersion of the dispersion compensating fiber removes the positive chirp from the optical signal, forming a signal with essentially no chirp. While such conventional methods are relatively simple to implement, they are limited in that they are passive; the dispersion compensation properties of such passive dispersion compensation devices are determined by the length and dispersion properties of the dispersion compensating fiber. If the chirp of the incoming optical signal is substantially different than that for which the device was designed, the device will be ineffective at providing an essentially chirp-free optical signal. Such devices are also generally unable to remove all of the chirp of the optical signal, imposing a residual dispersion on the transmission link. In an optical communications system with large distances of transmission fiber and multiple passive dispersion compensation devices, the residual dispersion can have a significant impact on the quality of the optical signal. Residual dispersion is especially damaging in long-distance (e.g. >1000 km) 10 Gb/s systems as well as in 40 Gb/s systems.

Wavelength division multiplexing techniques have become ubiquitous in optical communications. As such, optical signals typically have a plurality of wavelength channels over a relatively broad (e.g. tens of nanometers) range of wavelengths. It is therefore desirable for dispersion compensating devices to provide dispersion compensation over a broad range of wavelengths. Conventional grating-based devices and planar waveguide-based devices provide controllable dispersion compensation only over a relatively narrow band of wavelengths, and are very expensive to produce. Micro-optic-based dispersion compensators have also been proposed. While these devices can provide broadband compensation, they suffer from high excess loss and low reliability.

SUMMARY OF THE INVENTION

One aspect of the present invention relates to a dispersion compensating device for an optical signal having a plurality of wavelength channels lying within a wavelength range, the dispersion compensating device including a negative dispersion fiber having an input configured to receive the optical signal, the negative dispersion fiber having a length and dispersion sufficient to remove any positive chirp from each wavelength channel of the optical signal, thereby outputting a negatively chirped optical signal; an amplifying device configured to amplify the negatively chirped optical signal; a nonlinear positive dispersion fiber configured to receive the negatively chirped optical signal.

Another aspect of the present invention relates to an optical communications system for an optical signal having a plurality of wavelength channels lying within a wavelength range, the optical communications system including a negative dispersion fiber having an input configured to receive the optical signal, the negative dispersion fiber having a length and dispersion sufficient to remove any positive chirp from each wavelength channel of the optical signal, thereby outputting a negatively chirped optical signal; an amplifying device configured to amplify the negatively chirped optical signal; and a nonlinear positive dispersion fiber configured to receive the negatively chirped optical signal.

Another aspect of the present invention relates to a method for performing dispersion compensation of an optical signal, the optical signal having a plurality of wavelength channels lying within a wavelength range, the method including the steps of removing any positive dispersion from each wavelength channel of the optical signal, thereby forming a negatively chirped optical signal; amplifying the negatively chirped optical signal; and propagating the negatively chirped optical signal in a nonlinear positive dispersion fiber.

The devices and methods of the present invention result in a number of advantages over prior art devices and methods. For example, the present invention provides a dispersion compensating device that can provide broadband compensation of a wavelength division multiplexed optical signal. The dispersion compensating devices, systems and methods of the present invention can effectively compress pulses having a wide range of chirps, thereby providing compensation for a wide range of residual dispersion values. The dispersion compensating devices, systems and methods of the present invention provide compression of pulses having a wide dynamic range of pulse widths and peak powers. The devices are fiber-based, and therefore do not suffer from high insertion losses associated with coupling energy into planar or micro-optic devices. The devices, systems and methods of the present invention rely on a nonlinear effect to provide dynamic compensation; as such, the device will react quickly to changes in the chirp of the optical signal.

The dispersion compensating devices of the present invention can also provide gain to an optical signal. The devices and methods of the present invention are especially useful for compensation of residual dispersion in long-distance 10 Gb/s and in 40 Gb/s optical communications systems.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DEFINITIONS

The following definitions are in accord with common usage in the art.

The refractive index profile is the relationship between refractive index and optical fiber radius.

Delta, $\Delta$, is the relative refractive index percent, $\Delta = (n_i^2 - n_c^2)/2n_c^2$, where $n_i$ is the specified refractive index in region i, and $n_c$ is the average refractive index of the cladding region. Deltas are conventionally expressed as percents.

DETAILED DESCRIPTION OF THE PREFERRED EMBODIMENTS

Figure 1:
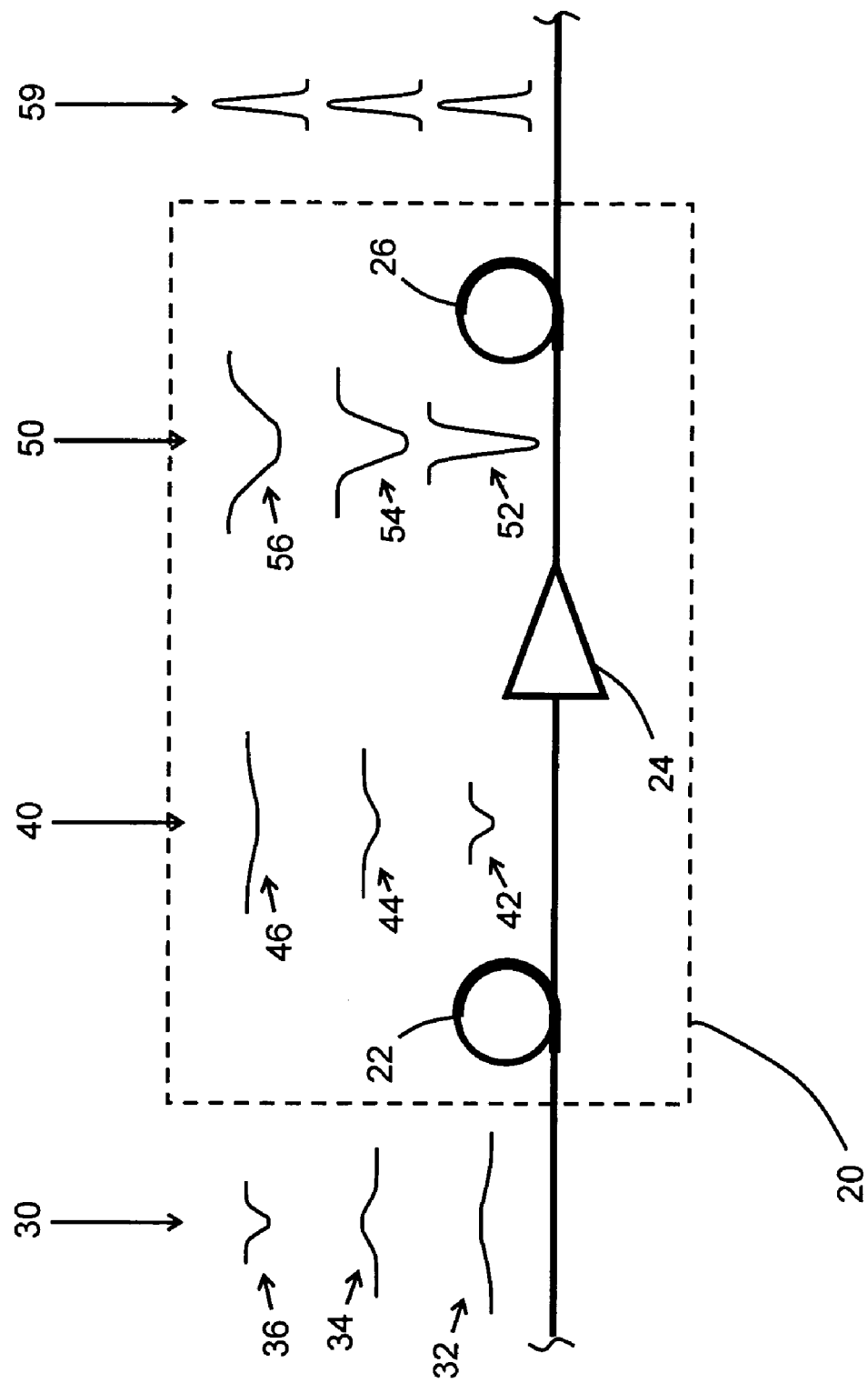
FIG. 1 is a schematic view of a dispersion compensating device according to one embodiment of the present invention.

One aspect of the present invention relates to a dispersion compensating device including a negative dispersion fiber, an amplifying device, and a positive dispersion fiber. A dispersion compensating device according to one aspect of the present invention is shown in schematic view in FIG. 1. Dispersion compensating device 20 includes a negative dispersion fiber 22, a discrete amplifier 24, and a nonlinear positive dispersion fiber 26 connected in series. An input optical signal 30 including distorted pulses 32, 34 and 36 enter the device at the negative dispersion fiber. Each of the distorted pulses 32, 34 and 36 may be from a single wavelength channel of a wavelength division multiplexed optical signal. Pulses coming from conventional optical communications systems may have a positive chirp or a negative chirp, depending on the wavelength dependence of the dispersion characteristics of the transmission fibers and dispersion compensating devices of the system. In the example of FIG. 1, pulse 32 has a larger positive chirp than does pulse 34, while pulse 36 has a negative chirp In the drawings of the present application, positively chirped pulses are drawn as positive peaks (e.g. pulse 32), while negatively chirped pulses are drawn as negative peaks (e.g. pulse 36).

The pulses 32, 34 and 36 propagate through the negative dispersion fiber 22. In desirable embodiments of the invention, the input optical signal 30 is not intense enough to cause significant nonlinear effects in the negative dispersion fiber. The negative dispersion fiber 22 has a length and negative dispersion sufficient to remove any positive chirp from each of the wavelength channels of the input optical signal 30. For example, the negative dispersion fiber may have a dispersion more negative than −50 ps/nm/km over the wavelength range of the input optical signal 30. In desirable embodiments of the present invention, the negative dispersion fiber has a length sufficient to impose a dispersion more negative than −300 ps/nm on the input optical signal. Propagation of the input optical signal 30 through the negative dispersion fiber yields a negatively chirped optical signal 40. In the example of FIG. 1, the negatively chirped optical signal 40 includes negatively chirped pulses 42, 44 and 46. Pulse 42 has the smallest negative chirp, while pulse 46 has the largest negative chirp.

The negatively chirped optical signal 40 is coupled into discrete amplifier 24. The discrete amplifier 24 may be, for example, an erbium-doped fiber amplifier, or a discrete Raman amplifier, and desirably has a control mechanism operable to adjust the gain of the amplifier. In embodiments of the present invention having germania-doped silica based nonlinear positive dispersion fibers, the amplifier desirably increases the power carried by each wavelength channel to at least about 5 mW. In especially desirable embodiments of the present invention having germania-doped silica based nonlinear positive dispersion fibers, the amplifier increases the power carried by each wavelength channel to at least about 15 mW. In embodiments of the present invention having nonlinear positive dispersion fibers with higher nonlinearity than silica (e.g. chalcogenide photonic crystal or 'holey' fibers), the amplifier may provide signinficantly less amplification.

The amplified negatively chirped optical signal 50 (including amplified pulses 52, 54 and 56) is coupled into nonlinear positive dispersion fiber 26. The amplified negatively chirped optical signal has a power sufficient to cause significant nonlinear effects in the nonlinear positive dispersion fiber 26. In the nonlinear positive dispersion fiber 26, the interplay of pulse compression due to the positive linear dispersion of the fiber and pulse expansion due to self phase modulation in the fiber acts to provide compressed pulses at the output of the fiber. For example, pulse 46 in FIG. 1 has a relatively large negative chirp. As the pulse propagates along the nonlinear positive dispersion fiber, the positive dispersion of the nonlinear positive dispersion fiber will serve to narrow pulse 46. As the pulse becomes more and more narrow, its power density increases, and pulse expansion due to self phase modulation becomes more and more important, gradually lessening the compression effect of the positive dispersion of the fiber. At some level of pulse compression, the expansion due to self phase modulation essentially balances the compression due to dispersion, causing the pulse to propagate through the remainder of the nonlinear positive dispersion fiber without any further significant compression or expansion. The length of the nonlinear positive dispersion fiber is chosen to guarantee that pulses with the smallest positive chirp at the input of the device (and hence the largest negative chirp at the input of the nonlinear positive dispersion fiber) propagate a sufficient distance in the nonlinear positive dispersion fiber to achieve the state of self phase modulation/dispersion balance.

Figure 2:
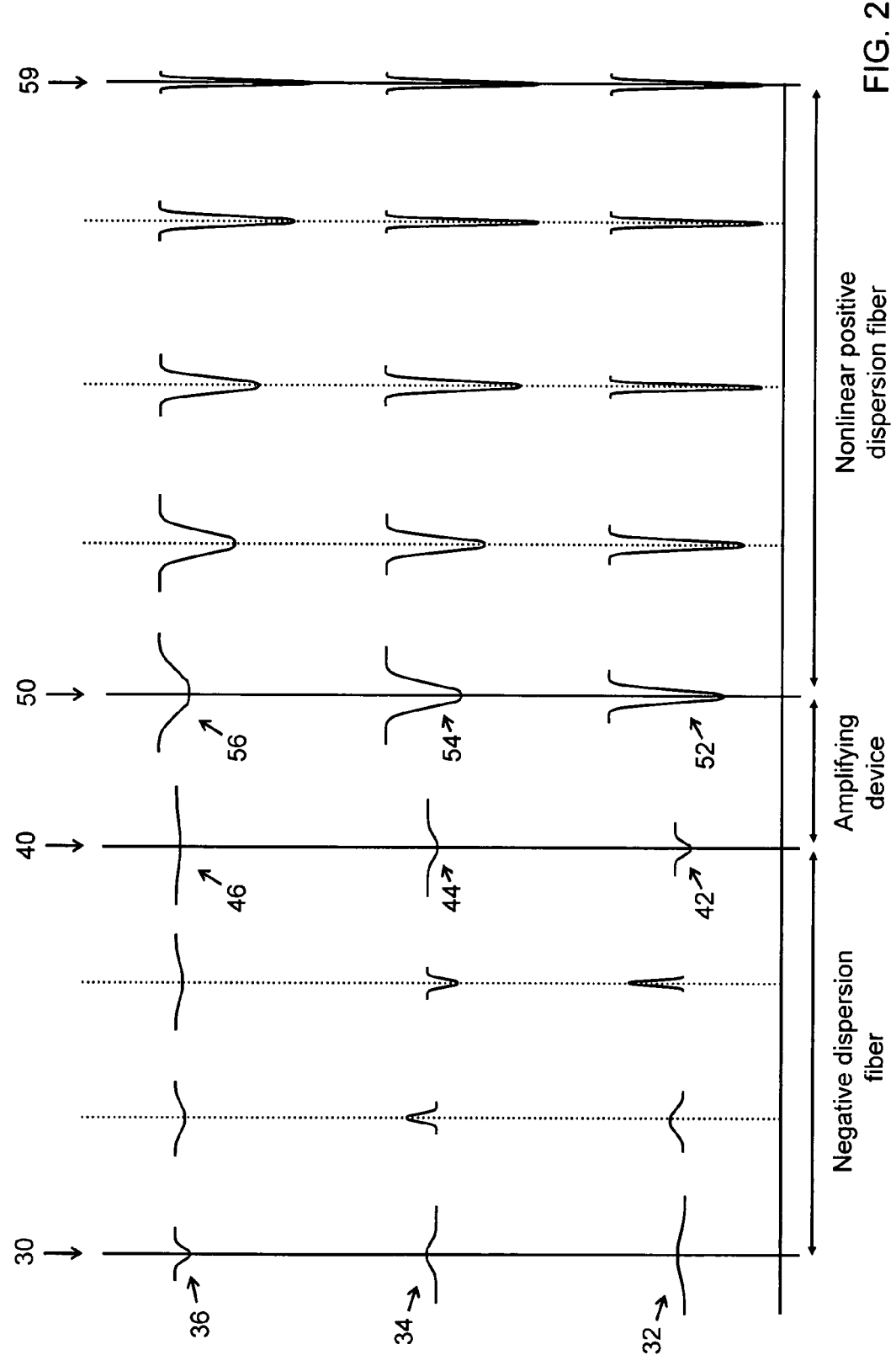
FIG. 2 is a diagram showing pulse width and chirp of three wavelength channels at various points in the dispersion compensating device of FIG. 1.

A diagram quantitatively showing pulse width and chirp at various points in the device of FIG. 1 is shown in FIG. 2. Upon entering the device, pulse 32 has a larger pulse width than does pulse 34. Both pulses 32 and 34 are positively chirped. Pulse 36 has a negative chirp. After the negative dispersion fiber, all three pulses are negatively chirped, with pulse 46 having the largest negative chirp and pulse width. The pulses are amplified to yield amplified pulses 52, 54 and 56. As pulse 56 propagates through the nonlinear positive dispersion fiber, the positive dispersion of the fiber compresses the pulse. As the pulse becomes more and more compressed, its peak power increases, causing expansion due to self phase modulation to become increasingly important. Eventually, the expansion and compression cancel each other out, and compressed pulse propagates through the remainder of the nonlinear positive dispersion fiber with little further change in pulse width. Pulse 54 is narrower in width than pulse 56, and reaches the state of dispersion/self phase modulation balance before pulse 56. Pulse 52 is already mostly compressed when it enters the nonlinear positive dispersion fiber, and reaches the state of dispersion/self phase modulation balance after a relatively short propagation distance. It is noted that while the output signal 59 is shown here as having a slight negative chirp, the chirp of the pulses of the output signal may be negative, positive, or essentially zero.

The amount of self phase modulation of a pulse in an optical fiber is proportional to the power of the pulse. As such, the effective gain of the amplifier can be controlled to select a desired level of self phase modulation in the nonlinear positive dispersion fiber, and therefore determine the balance between dispersion and self phase modulation.

Figure 3:
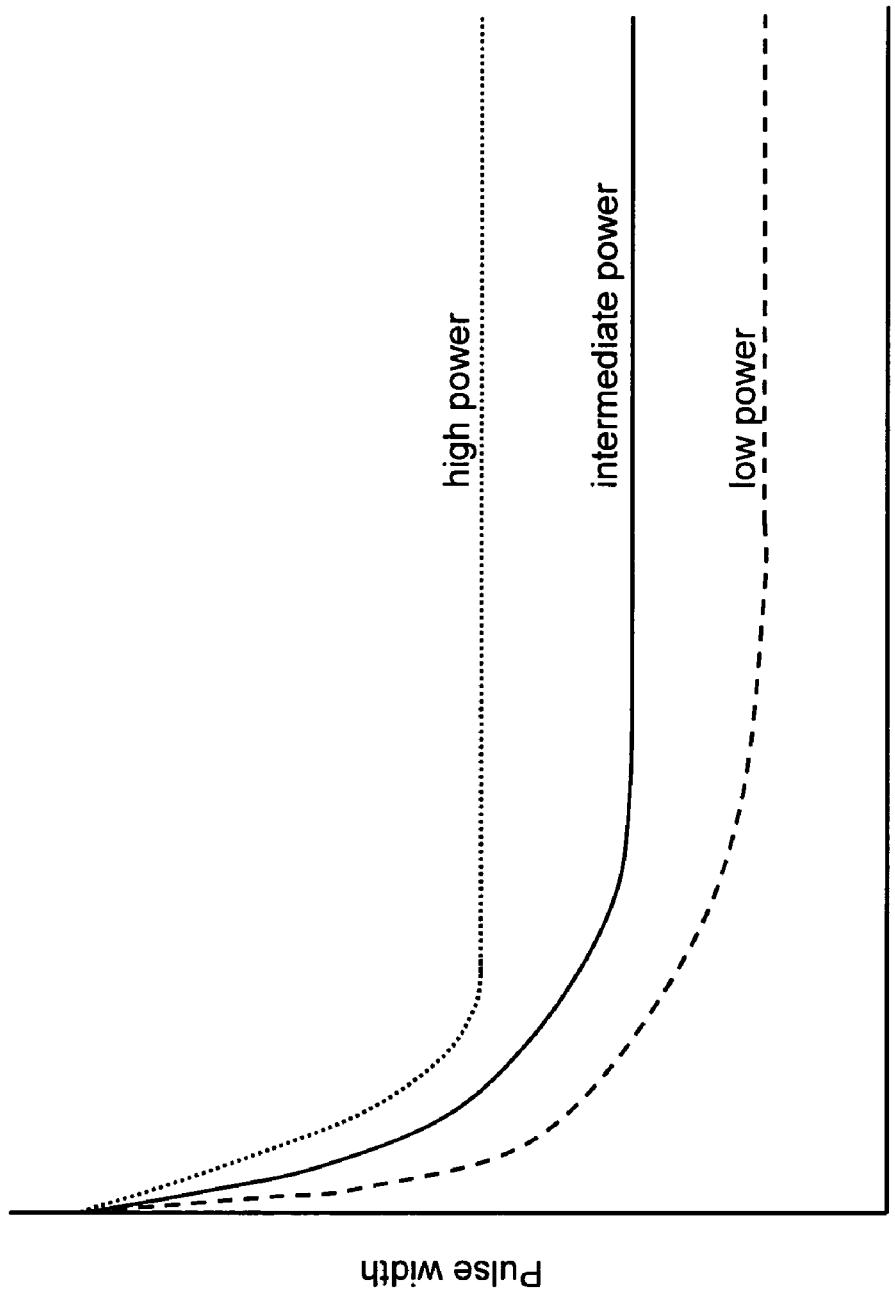
FIG. 3 is a graph showing the qualitative relationship between pulse width of amplified negatively chirped pulses and propagation distance in a nonlinear positive dispersion fiber.

It is noted that the effective gain of the amplifier can be controlled by adjusting the gain of the amplifier itself, or by using a variable optical attenuator at the output of the amplifier. FIG. 3 is a graph showing the qualitative relationship between pulse width of amplified negatively chirped pulses and propagation distance in a nonlinear positive dispersion fiber for input pulses having the same pulse width but different peak powers. Higher amplification causes more self phase modulation, which causes the more amplified pulse to reach a state of compression/expansion balance earlier in the fiber than the less amplified pulses. The gain of the amplifier can be set by the skilled artisan to minimize the width of the pulses propagating in the nonlinear positive dispersion fiber. Feedback control may also be used to dynamically control the pulse widths.

The skilled artisan can use standard numerical methods to simulate the balance between self phase modulation and fiber dispersion for purposes of device design. For example, the total field method proposed by François in "Nonlinear propagation of ultrashort pulses in optical fibers: total field formulation in the frequency domain," J. Opt. Soc. Am B, Vol. 8, No. 2, pp 276–293, February 1991, which is incorporated herein by reference, may be used. A good approximation of the pulse power required to balance dispersion and self phase modulation in a nonlinear positive dispersion fiber is given by the equation $$P = \frac{\lambda^3 DA}{1.28\pi^2 c n_2 \tau^2}$$

in which P is the power of the pulse, $\lambda$ is the center wavelength of the pulse, D is the dispersion of the optical fiber (e.g. in ps/nm/km), c is the speed of light, $n_2$ is the nonlinear index of refraction of the material of the core of the nonlinear positive dispersion fiber (e.g.: silica has $n^2 \sim 3 \times 10^{-16}$ cm$^2$/W), and $\tau$ is the width of the pulse. Further information regarding soliton propagation may be found in *Fiber Optics Handbook*, Michael Bass ed., Chapter 7: "Solitons in Optical Fiber Communication Systems," P. V. Manyshev, McGraw-Hill, 2002.

Figure 4:
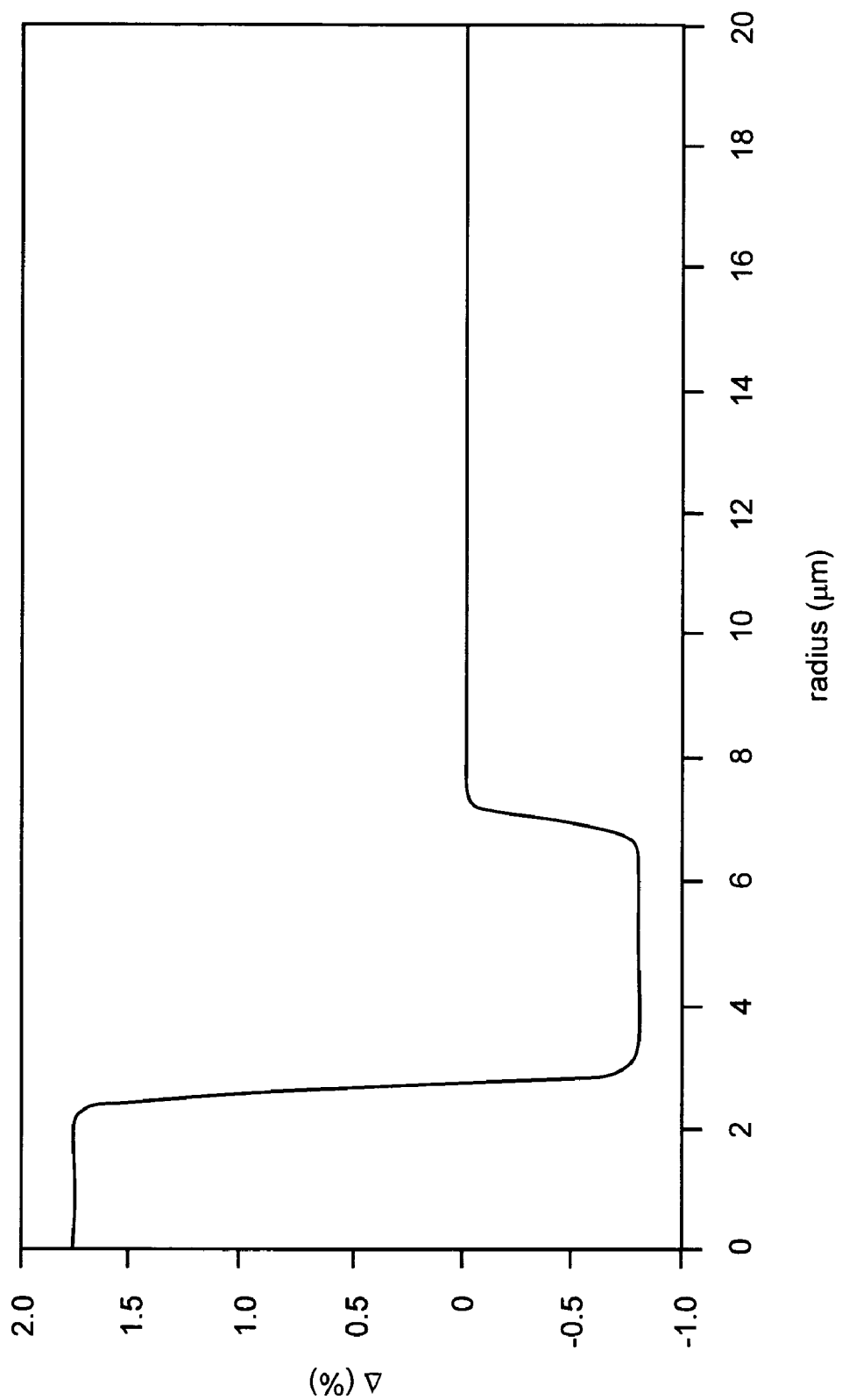
FIG. 4 is a diagram of a profile of a suitable nonlinear positive dispersion fiber for use in the present invention.
Figure 5:
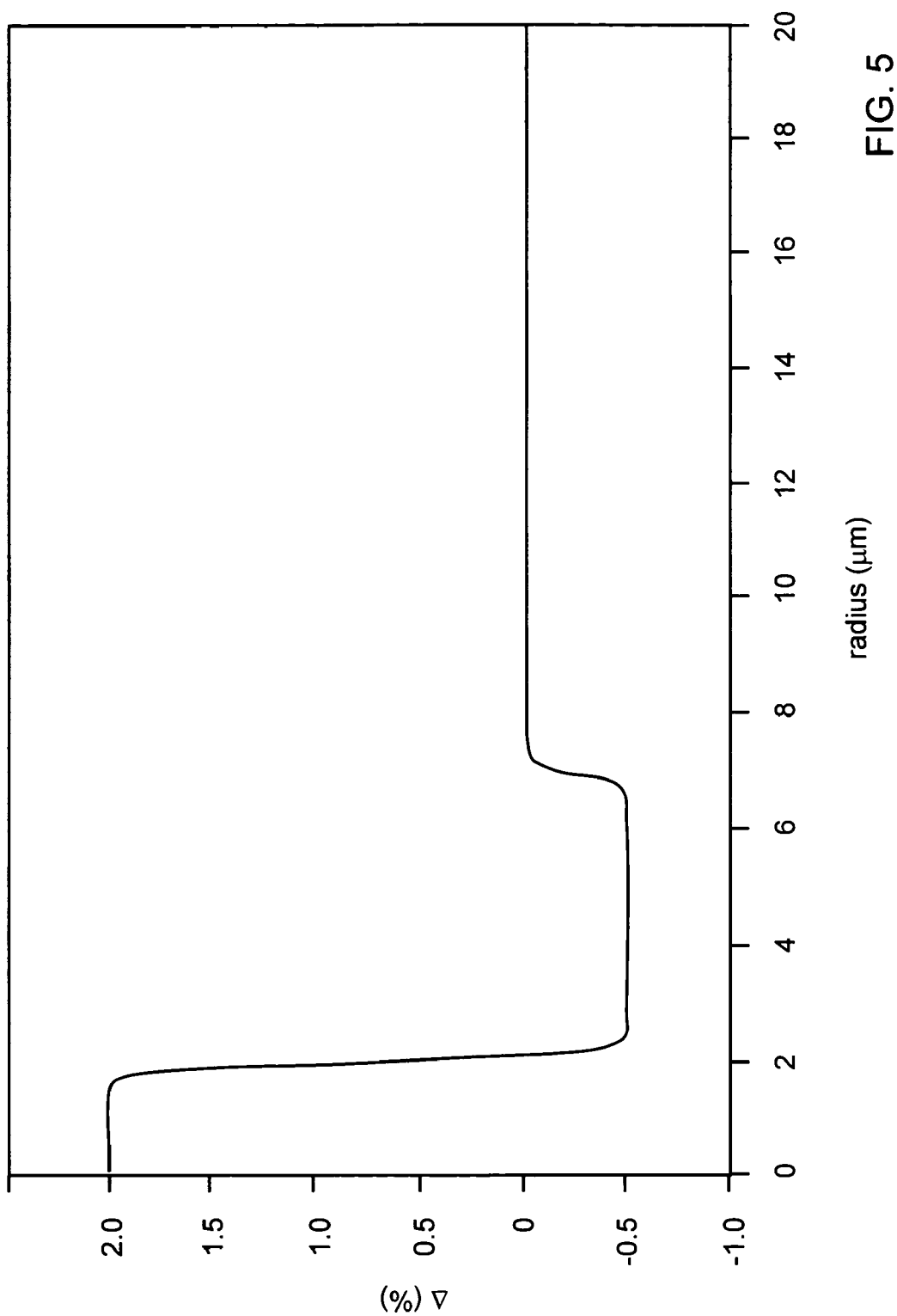
FIG. 5 is a diagram of a profile of another suitable nonlinear positive dispersion fiber for use in the present invention.

In order to minimize the power required to achieve the desired balance of self phase modulation and dispersion, it may be desirable for the nonlinear positive dispersion fiber to have an effective area less than about 35 $\mu m^2$, and a dispersion more positive than about 8 ps/nm/km. For use with optical communication systems operating at 10 Gb/s, it may be desirable for the nonlinear positive dispersion fiber to have a dispersion between about 15 ps/nm/km and about 30 ps/nm/km over the wavelength range of the optical signal. An example of a suitable nonlinear positive dispersion fiber for use in a 10 Gb/s device is shown in FIG. 4. At a wavelength of 1550 nm, the fiber of FIG. 4 is predicted to have a single mode cutoff wavelength of about 1545 nm, an effective area of about 18 $\mu m^2$, a dispersion of about 23 ps/nm/km, a dispersion slope of about 0.052 ps/nm$^2$/km, and an attenuation of about 0.25 dB/km. Suitable nonlinear positive dispersion fibers for use with optical communication systems operating at 40 Gb/s have dispersion values between about 8 and about 20 ps/nm/km over the wavelength range of the optical signal. An example of a suitable nonlinear positive dispersion fiber for use in a 40 Gb/s device is shown in FIG. 5. At a wavelength of 1550 nm, the fiber of FIG. 5 is predicted to have a single mode cutoff wavelength of about 1331 nm, an effective area of about 13 $\mu m^2$, a dispersion of about 10 ps/nm/km, a dispersion slope of about 0.033 ps/nm²/km, and an attenuation of about 0.27 dB/km. The nonlinear positive dispersion fibers of FIGS. 4 and 5 can be fabricated by the skilled artisan, for example, using germanium and fluorine-doping of silica glass using standard OVD, MCVD, PCVD or VAD methods. Other nonlinear positive dispersion fibers may be used in the present invention. For example, the skilled artisan may use microstructured optical fibers (e.g. photonic crystal or 'holey' fibers), such as those formed from chalcogenide glass materials and described in U.S. patent application Ser. No. 10/146,199, which is incorporated herein by reference. It is noted that due to the high nonlinearity of the chalcogenide glass materials, much lower pulse powers would be necessary to balance dispersion and self-phase modulation in such fibers.

Figure 6:
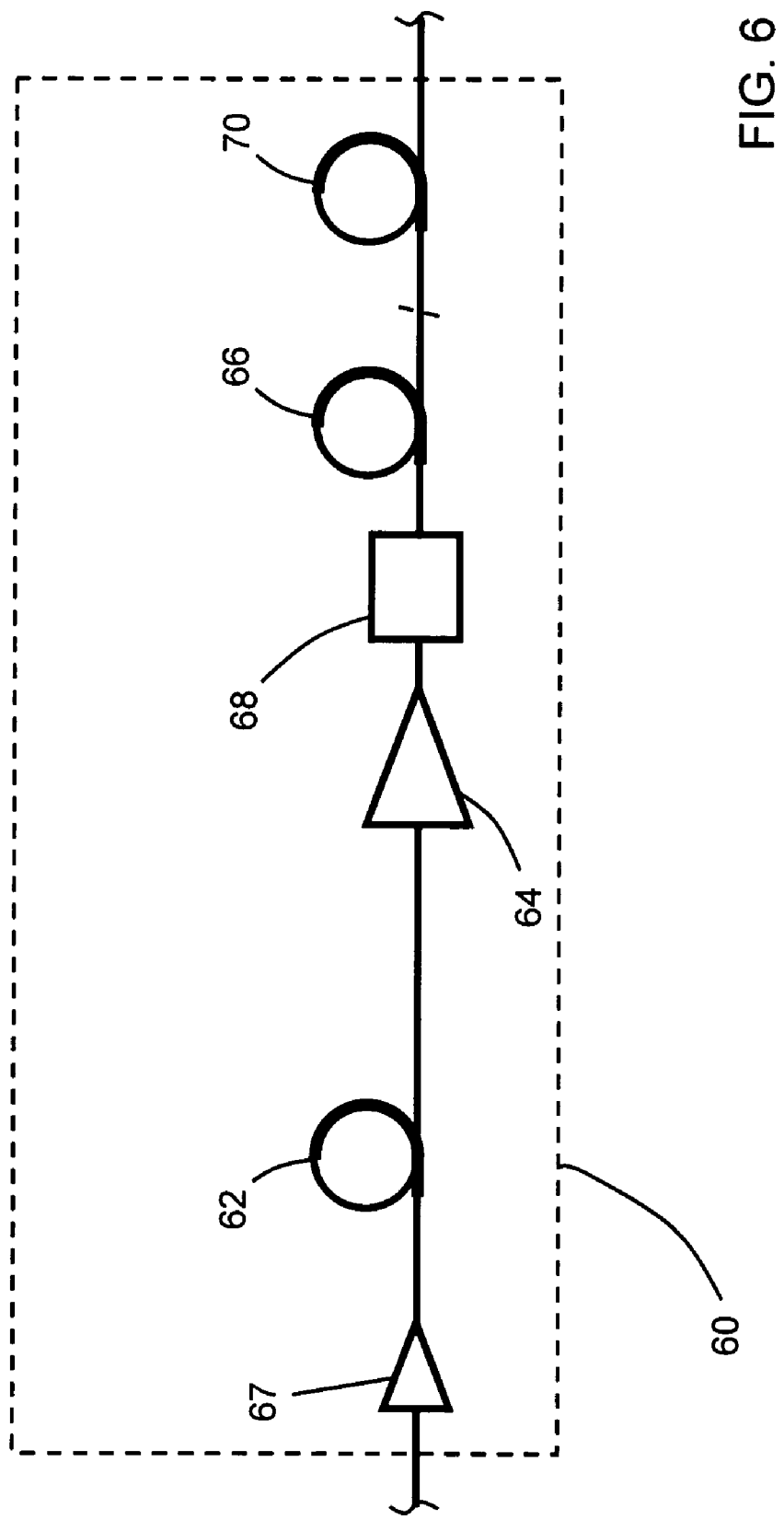
FIG. 6 is a schematic view of a dispersion compensating device according to another embodiment of the present invention.

Another embodiment of the invention is shown in schematic view in FIG. 6. The dispersion compensating device 60 includes a negative dispersion fiber 62, a discrete amplifier 64, and a nonlinear positive dispersion fiber 66, as described in connection with FIG. 1. A pre-amplifier 67 is coupled to the input of the negative dispersion fiber. The pre-amplifier may be used to provide enough gain to the incoming optical signal so that it is not irreparably damaged by attenuation in the negative dispersion fiber. Desirably, the pre-amplifier does not boost the power of the incoming optical signal to a level sufficient to cause nonlinear effects in the negative dispersion fiber.

The dispersion compensating device 60 also includes a wavelength-dependent attenuator 68 operatively positioned between the discrete amplifier and the nonlinear positive dispersion fiber. The wavelength-dependent attenuator can be any suitable device that provides differing levels of attenuation for different wavelength channels of the optical signal. The wavelength-dependent attenuator may be passive or actively controllable, and may be based on various technologies, such as fiber Bragg gratings and cascaded Mach-Zehnder interferometers. The wavelength-dependent attenuator may be, for example, a tilt VOA or a slope VOA, such as those described in U.S. patent application Ser. No. 09/929,498, which is incorporated herein by reference; or a dynamic gain flattening filter such as that described in U.S. patent application Ser. No. 09/902,424, and in U.S. Patent Application Publication 2002/0054726, which are incorporated herein by reference. The wavelength-dependent attenuator allows the skilled artisan to adjust the compression of individual wavelength channels relative to one another. As discussed above, the compression of a pulse depends on both the dispersion of the nonlinear positive dispersion fiber and power of the pulse. The nonlinear positive dispersion fiber may have a significantly different dispersion for each wavelength channel of the optical signal. The amplifier may likewise have a significantly different gain for each wavelength channel of the optical signal. The skilled artisan may use the wavelength-dependent attenuator to adjust the pulse power of each wavelength channel to achieve a desired level of pulse compression. The wavelength-dependent attenuator may, for example, be used to flatten the gain of the discrete amplifier. The wavelength-dependent attenuator may also be used to provide higher pulse powers to wavelength channels having a higher wavelength or a higher dispersion in the nonlinear positive dispersion fiber. While in this embodiment the wavelength-dependent attenuator is operatively positioned between the discrete amplifier and the nonlinear positive dispersion fiber, it may also be positioned between the negative dispersion and the discrete amplifier in order to provide power compensation before amplification.

Dispersion compensating device 60 of FIG. 6 also includes a dispersion decreasing fiber 70 coupled to the output of the nonlinear positive dispersion fiber. A dispersion decreasing fiber is an optical fiber having a dispersion decreasing along its length. Dispersion decreasing fibers are described, for example, in "A Single Mode-Fiber with Chromatic Dispersion Varying Along the Length", Bogatyrev et al., J. Lightwave Tech., Vol. 9, No. 5, pp 561–566, 1991, which is incorporated herein by reference. When pulses with powers on the order of 10 mW are coupled from a high positive dispersion fiber to a low positive dispersion fiber, they can become distorted (e.g. by formation of pedestals). The dispersion decreasing fiber acts to transmit the compressed, high power pulses of the optical signal to a transmission fiber (e.g. LEAF®, available from Corning Incorporated of Corning, N.Y.) without distortion. As an alternative to a single dispersion decreasing fiber, a plurality of shorter fiber lengths, each having a lower dispersion than the previous fiber, may be used.

Figure 7:
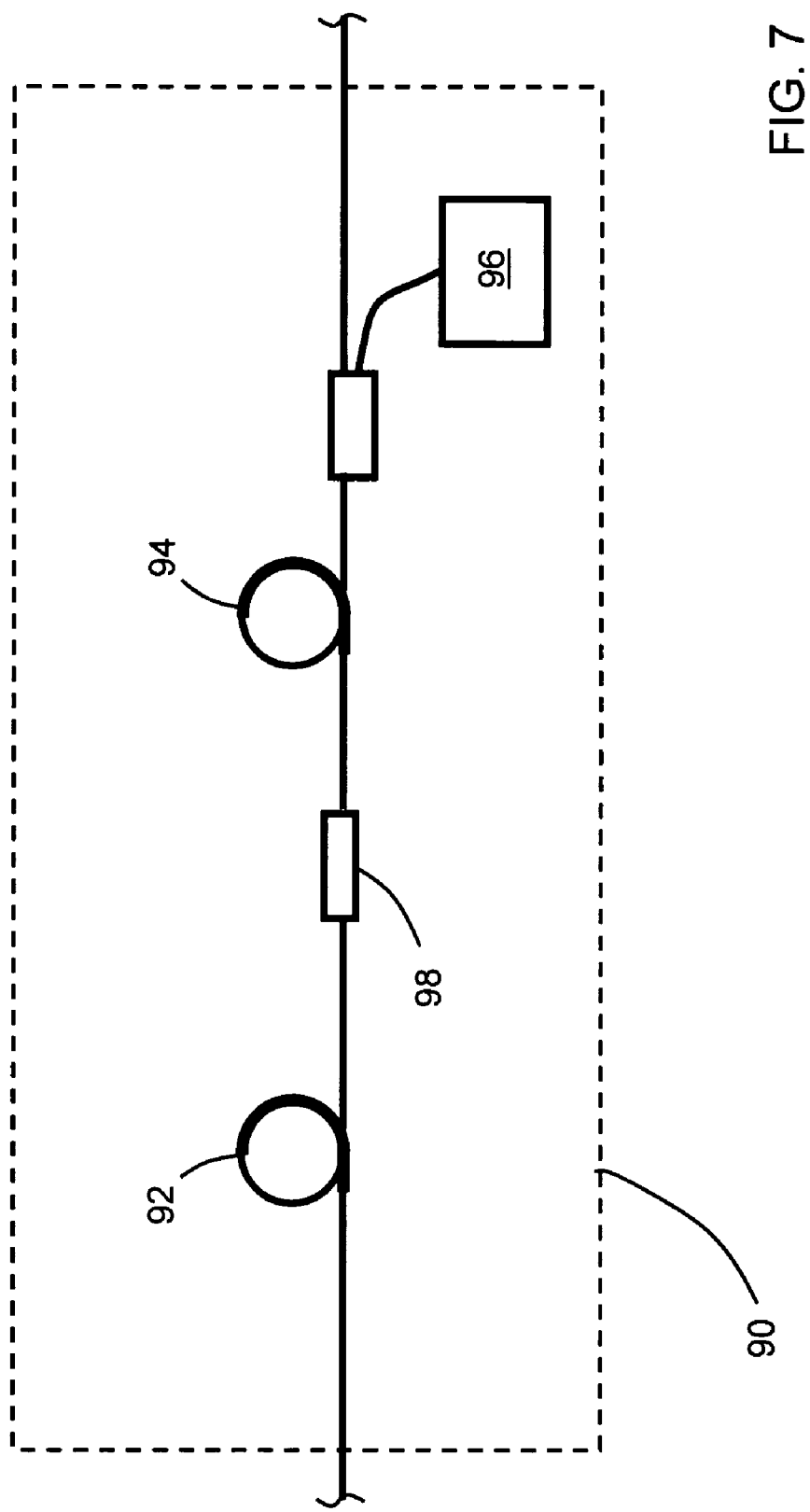
FIG. 7 is a schematic view of a dispersion compensating device using Raman amplification according to another embodiment of the present invention.

Another embodiment of the present invention is shown in schematic view in FIG. 7. In this embodiment of the invention, Raman pumping is used to provide gain in the nonlinear positive dispersion fiber. Dispersion compensating device 90 includes a negative dispersion fiber 92 and a nonlinear positive dispersion fiber 94 connected in series. The dispersion compensating device also includes an amplifying device configured to amplify the negatively chirped optical signal. According to this embodiment of the invention, the amplifying device is a Raman pump source 96 configured to cause Raman amplification of the optical signal in the nonlinear positive dispersion fiber 94. As shown in FIG. 7, the Raman pump source 96 may be configured to counterpump the nonlinear dispersion fiber; as the skilled artisan will appreciate, co-pumping or co-counterpumping configurations may also be used. An isolator 98 may be operatively positioned between the nonlinear positive dispersion fiber and the negative dispersion fiber to block the propagation of Raman pump power from the nonlinear positive dispersion fiber to the negative dispersion fiber. This embodiment of the invention is especially useful when the nonlinear positive dispersion fiber has an especially high nonlinearity (e.g. chalcogenide glass fibers).

Figure 8:
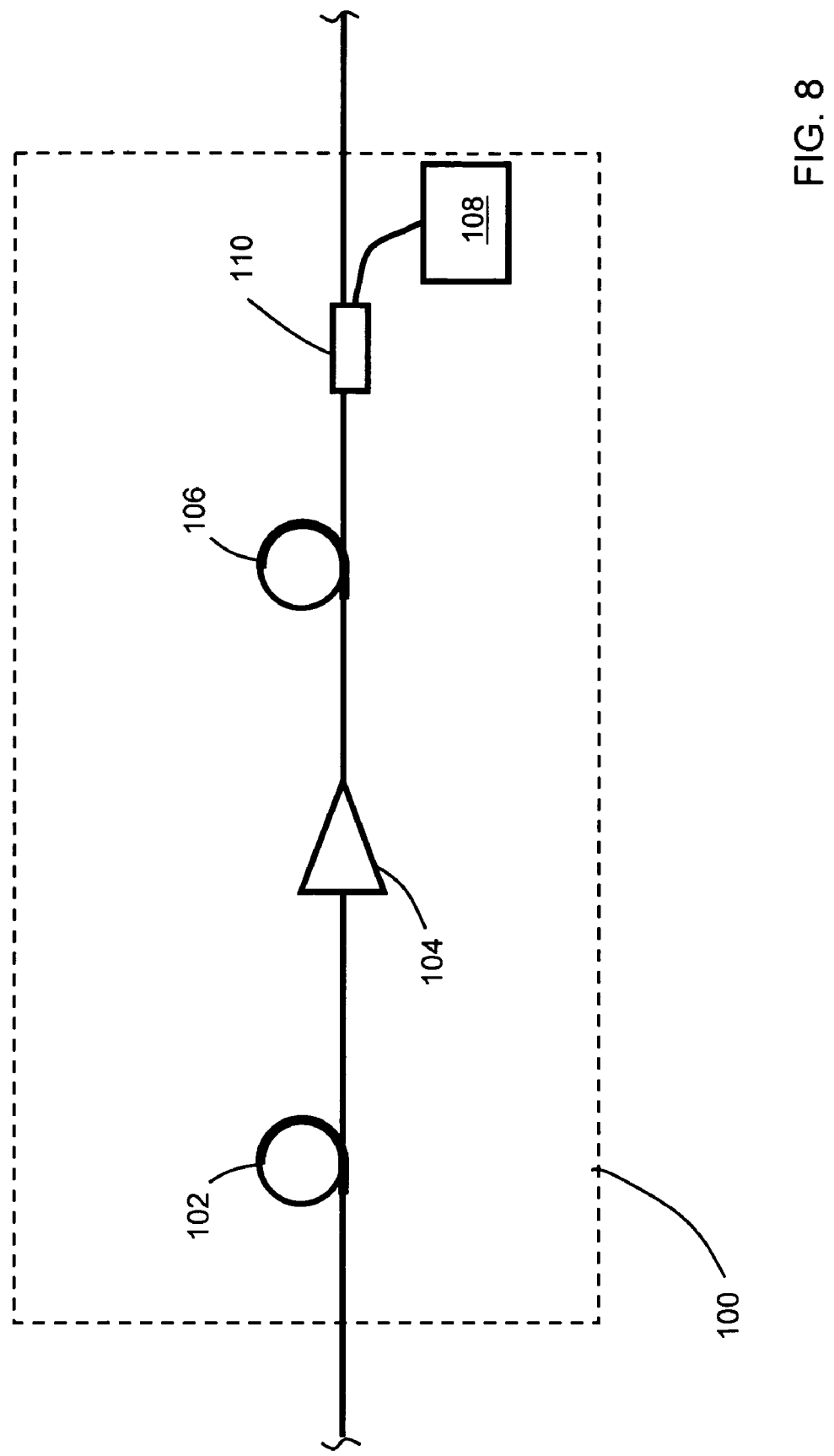
FIG. 8 is a schematic view of a dispersion compensating device using Raman amplification in conjunction with a discrete amplifier according to another embodiment of the present invention.

The nonlinear positive dispersion fiber will have a non-negligible propagation loss. As such, in using the device of FIG. 1, the gain of the discrete amplifier must be set high enough to ensure that pulses are sufficiently intense at the end of the fiber to maintain the state of balance between self phase modulation and dispersion. The gain may be required to be high enough that other nonlinear effects (e.g. cross phase modulation and four wave mixing) distort the optical signal. Raman pumping can also be advantageously used in conjunction with a discrete amplifier to reduce the gain necessary from the discrete amplifier. An example of such a device is shown in FIG. 8. Device 100 includes a negative dispersion fiber 102, a discrete amplifier 104, and a nonlinear positive dispersion fiber 106, as described in connection with FIG. 1. The device also includes a Raman pump source 108 coupled to the nonlinear positive dispersion fiber via a WDM coupler 110. Raman pumping of the nonlinear positive dispersion fiber will provide additional amplification of the optical signal, allowing the gain of discrete amplifier 104 to be reduced. Desirably, the Raman pumping provides about enough amplification to counteract the effects of attenuation in the nonlinear positive dispersion fiber. In especially desirable embodiments of the present invention, the Raman pumping provides significant amplification over and above that needed to counteract the attenuation of the fiber, further reducing the gain necessary from the discrete amplifier.

The devices of the present invention may further include an enclosure in which the nonlinear positive dispersion fiber and the negative dispersion fiber are packaged. The amplifying device (e.g. discrete amplifier or Raman pump source) may also be packaged in the enclosure; alternatively, the amplifying device or Raman pump source may be located outside the enclosure.

Another aspect of the invention relates to an optical communications system including a negative dispersion fiber having an input configured to receive the optical signal, the negative dispersion fiber having a length and dispersion sufficient to remove any positive chirp from each wavelength channel of the optical signal, thereby outputting a negatively chirped optical signal; an amplifying device configured to amplify the negatively chirped optical signal; a nonlinear positive dispersion fiber configured to receive the negatively chirped optical signal. The negative dispersion fiber, amplifying device, and nonlinear positive dispersion fiber have properties substantially as described above. In desired embodiments of the present invention, there exists substantially no transmission fiber (e.g. less than 10 km, more desirably less than 1 km) operatively coupled between the negative dispersion fiber and the nonlinear positive dispersion fiber. It is noted that the length of fiber included in a discrete amplifier is not considered herein to be transmission fiber. The negative dispersion fiber and the nonlinear positive dispersion fiber may optionally be packaged in an enclosure. The systems of the present invention may be practiced substantially as described above in connection with the devices of the present invention.

Another aspect of the invention relates to a method for performing dispersion compensation of an optical signal having a plurality of wavelength channels lying within a wavelength range. The method includes the steps of removing any positive dispersion from each wavelength channel of the optical signal, thereby forming a negatively chirped optical signal; amplifying the negatively chirped optical signal; and propagating the negatively chirped optical signal in a nonlinear positive dispersion fiber. As described above in connection to FIG. 1, the step of removing any positive dispersion may be performed by propagating the optical signal through a negative dispersion fiber having a length and dispersion sufficient to remove any positive chirp from each wavelength channel of the optical signal. The step of amplifying the negatively chirped optical signal is performed by propagating the optical signal through a discrete amplifier; or may be performed by Raman pumping the nonlinear positive dispersion fiber. The negative dispersion fiber, amplifying device, and nonlinear positive dispersion fiber have properties substantially as described above. The gain of the amplification may be controlled to provide a desired level of compression of the pulses of the optical signal. The methods of the present invention may be practiced substantially as described above in connection with the devices of the present invention.

EXAMPLES

The present invention is further described by the following non-limiting examples.

Example 1

A dispersion compensating device including a negative dispersion fiber, an amplifying device, and a nonlinear positive dispersion fiber was constructed as shown in FIG. 1. The negative dispersion fiber was a flat slope dispersion compensating single mode fiber of a length sufficient to impose a dispersion of −440 ps/nm. The amplifying device included an erbium-doped fiber amplifier capable of 100 mW output along with a variable optical attenuator to control the gain of the amplifier. The nonlinear positive dispersion fiber had a dispersion of −22 ps/nm/km at a wavelength of 1550 nm, a propagation loss of about 0.45 dB/km, an effective area of 38 $\mu m^2$, and a length of 20 km.

An optical transmission system was coupled to the input of the negative dispersion fiber. The optical network system included 12 optical nodes (e.g. 4 optical cross-connects and 7 optical add-drop multiplexers) with 11 spans of LEAF® 100 km in length connecting the nodes. Each span of LEAF® was compensated using a dispersion compensating module. An extra length of fiber was added to the system to yield a residual dispersion of about 300 ps/nm at 1535.78 nm. The optical signal-to-noise ratio at the end of the transmission system was about 21 dB. The output of the dispersion compensating device was coupled to a photodetector.

Figure 9:
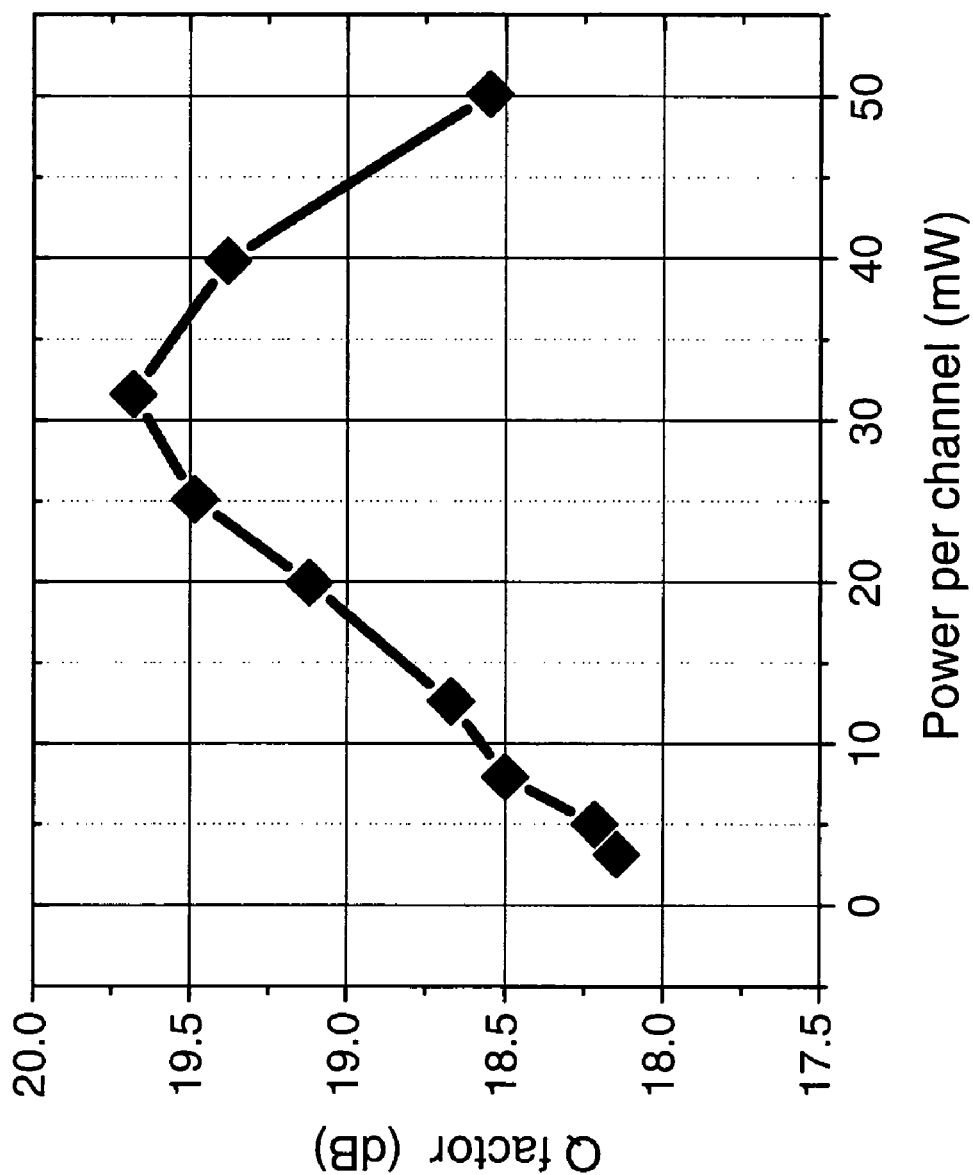
FIG. 9 is a graph showing Q factor vs. per channel power for the two channel experiment of Example 1.
Figure 10:
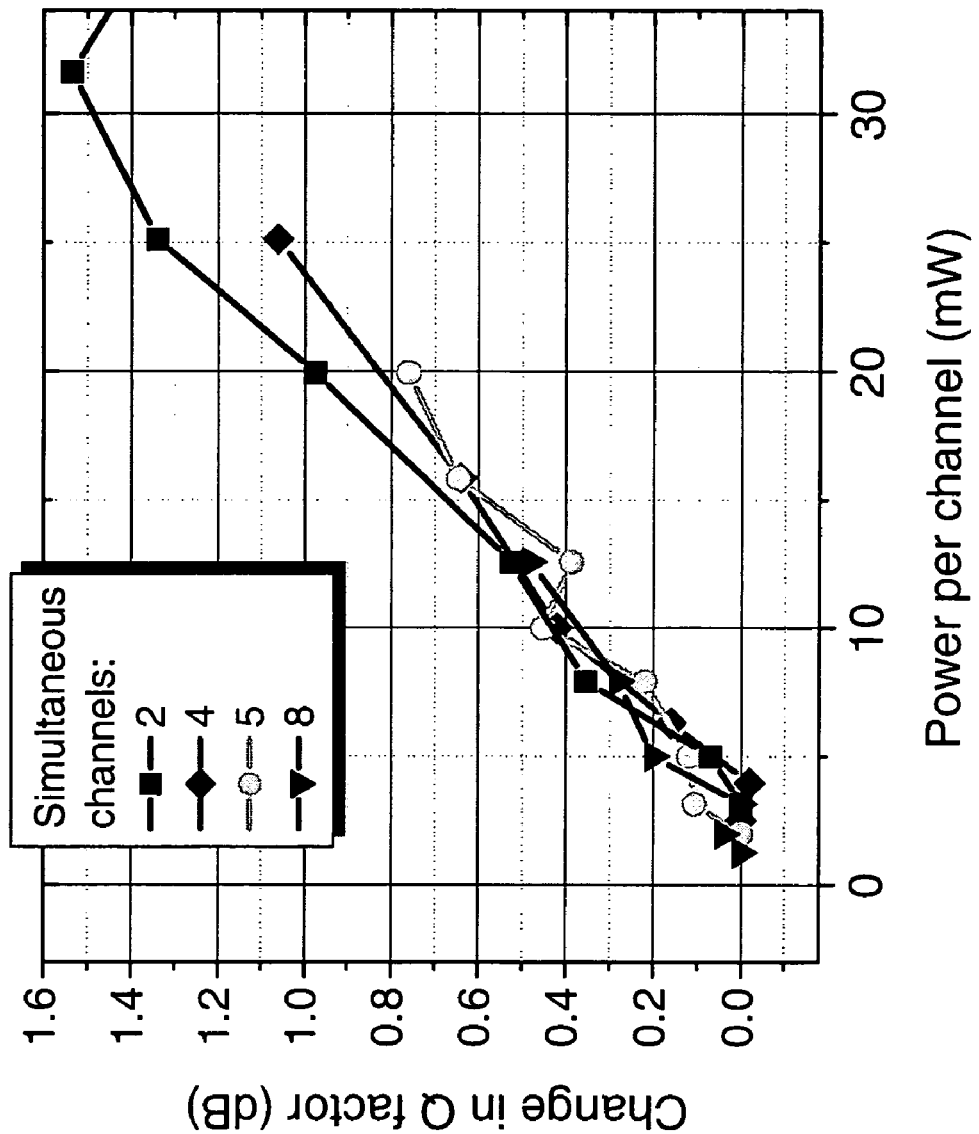
FIG. 10 is a graph showing Q factor improvement vs. per channel power for multiple channel experiments of Example 1.

An optical signal was allowed to propagate through the optical transmission system, through the dispersion compensating device, and into the photodetector. The optical signal had 38 channels at a 100 GHz channel spacing, with each channel carrying a 10 Gb/s RZ signal with a 50% duty cycle. In a first experiment, only two channels (1535.78 nm and 1537.38 nm) were allowed to couple from the transmission system to the dispersion compensating device. FIG. 9 shows a graph ror the 1535.78 nm channel of system Q factor vs. the per channel power of the amplifying device of the dispersion compensating device. A maximum increase in Q factor of about 1.5 dB is achieved with a per channel power of about 30 mW. This improvement is significantly higher than the penalty arising from the dispersion itself, which results from the fact that the pulses can be compressed even further than the 50% duty cycle with which they were transmitted. For power levels greater than 30 mW, the Q factor begins to be reduced as a result of eye closure due to overcompression of the pulse. It is noted that the 1537.38 nm channel exhibited a similar increase in Q factor.

In subsequent experiments, greater numbers of channels (e.g. 4, 5, 8) were coupled into the dispersion compensating device. Similar trends in increase in Q factor were achieved in these multi-channel systems. It is noted that the per channel power was limited in these experiments by the 100 mW output power of the erbium-doped fiber amplifier. For example, the maximum per channel power for the 5 channel experiment was 20 mW, which does not appear to be sufficient for optimum pulse compression. The nonlinear positive dispersion fiber used in these experiments had a relatively large effective area; the power requirements of the device would be greatly relaxed by use of a nonlinear positive dispersion fiber with a smaller effective area.

Very little pulse distortion due to cross phase modulation and four wave mixing was observed at 100 GHz channel spacings. However, some cross phase modulation was observed in experiments at 50 GHz; for 50 GHz systems, it may be desirable to separate the 50 GHz signal into two interleaved 100 GHz signals, then use two separate dispersion compensating devices.

Example 2

Figure 11:
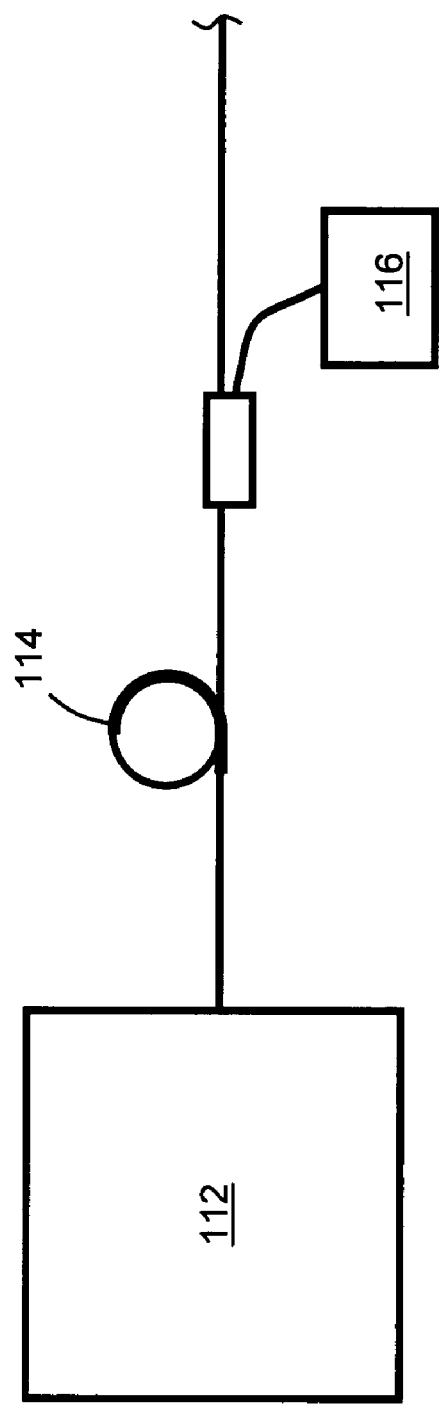
FIG. 11 is a schematic diagram of the experimental setup of Example 2.

The effect of Raman pumping on the devices of the present invention was investigated using the experimental setup of FIG. 11. A negatively chirped input signal was generated by gain switching a DFB laser diode 112 at 10 GHz. The center wavelength of the signal was 1546.72 nm, and the spectral bandwidth and duration of the pulses were 0.32 nm and 21.7 ps, respectively. The estimated chirp parameter of the pulses was C=1.67. The gain of the laser diode was adjusted to provide a desired signal power. It is noted that the high power, negatively chirped input signal simulated the output of the amplifying device in the devices of the present invention.

The negatively chirped input signal was coupled into a 5773 m length of nonlinear positive dispersion fiber 114 having a loss at 1450 nm of 0.766 dB/km, a loss at 1550 nm of 0.448 dB/km, a mode field diameter at 1550 nm of 4.416 µm, a dispersion at 1550 nm of 3.961 ps/nm/km, a dispersion slope at 1550 nm of 0.0486 ps/nm$^2$/km, and a single mode cutoff wavelength of 1129 nm. The total attenuation of the fiber in the experiment was measured to be about 5.5 dB at the signal wavelength. A Raman pump source 116 operating at 1440.5 nm was configured to counterpump the nonlinear dispersion fiber 114. Pulse compression experiments were performed at a variety of input signal powers (simulating the effect of amplifying device gain in the devices of the present invention) and Raman pump powers.

Figure 12:
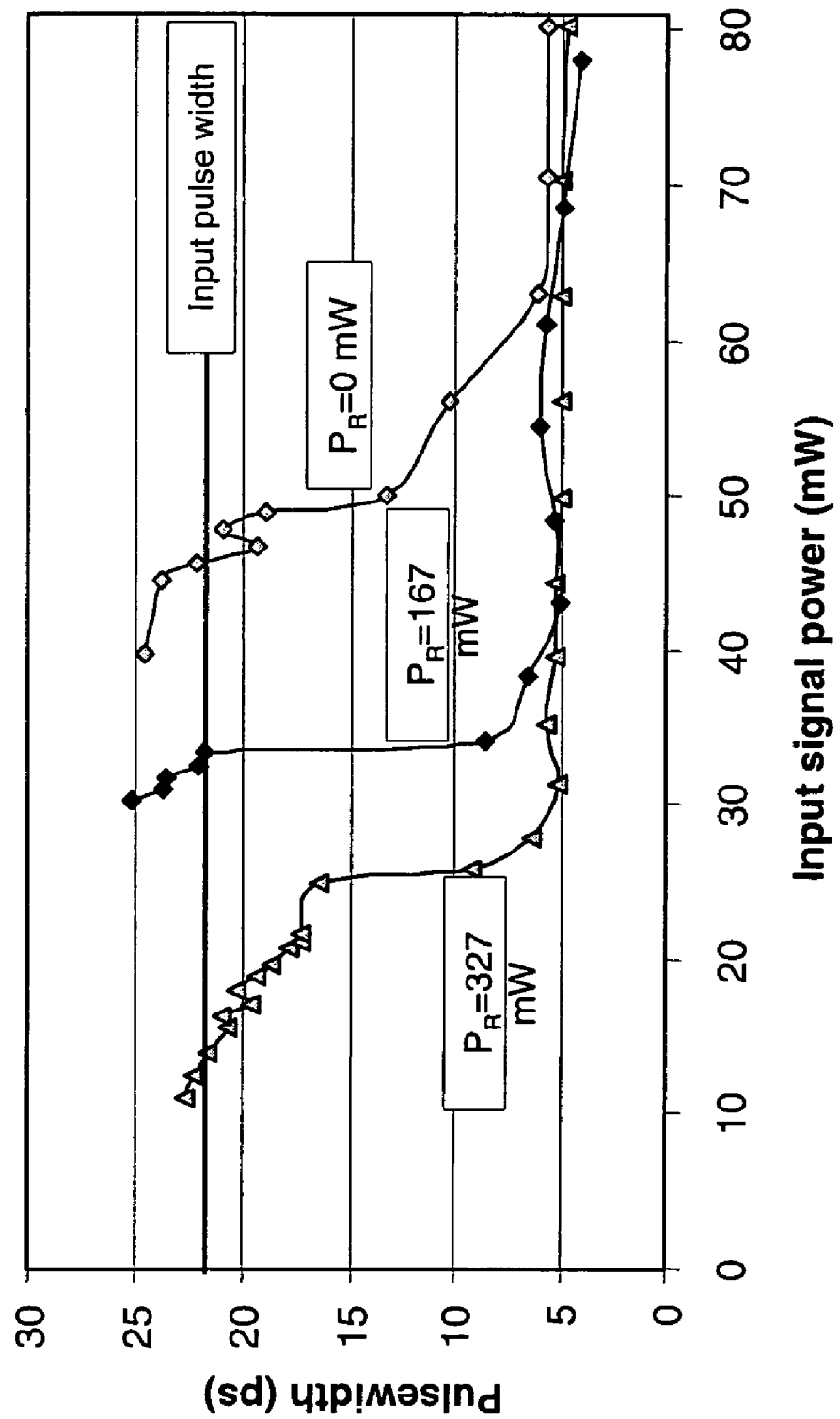
FIG. 12 is a graph showing pulse width vs. input signal power for three different Raman pump powers for the experiment of Example 2.
Figure 13:
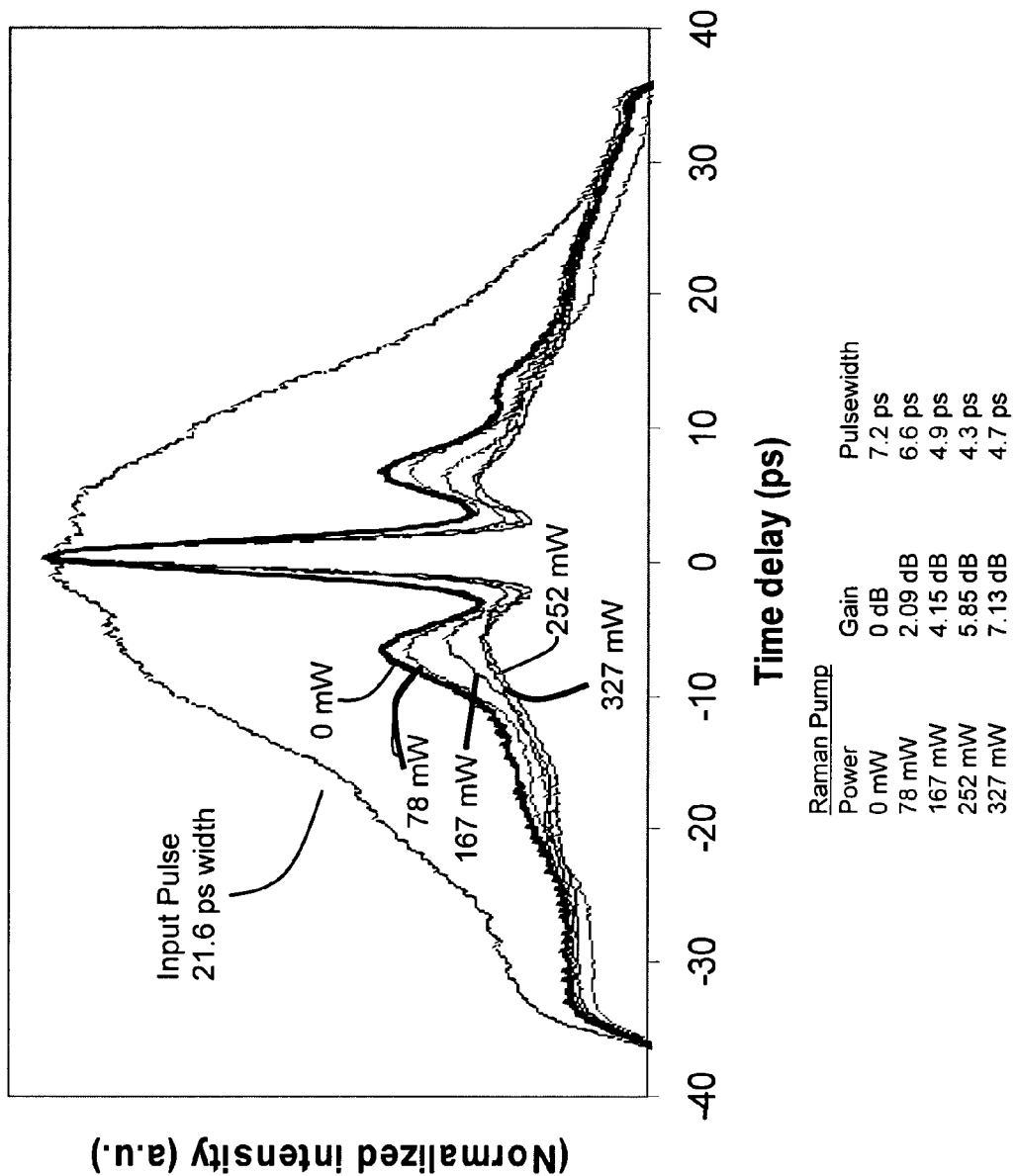
FIG. 13 is a set of autocorrelation traces for a series of different Raman pump powers for the experiment of Example 2.

FIG. 12 is a graph of pulse width vs. input signal power for a three different Raman pump powers. The skilled artisan will note that the threshold input signal power necessary for achieving dispersion compensation was significantly reduced by Raman pumping of the nonlinear positive dispersion fiber. FIG. 13 is a set of autocorrelation traces for the input signal pulse and output pulses for an average input signal power of 70.46 mW. The pedestal-shaped distortion of the output signal may be minimized by judicious choice of Raman pump power. It is noted that in this experiment, the output signal distortions were minimized when the Raman pump power was set at a level such that the Raman gain in the fiber approximately negated the propagation loss of the fiber at the signal wavelength.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A dispersion compensating device for an optical signal having a plurality of wavelength channels lying within a wavelength range, the dispersion compensating device comprising:
a negative dispersion fiber having an input configured to receive the optical signal, the negative dispersion fiber having a length and dispersion sufficient to remove any positive chirp from each wavelength channel of the optical signal, thereby outputting a negatively chirped optical signal;
an amplifying device configured to amplify the negatively chirped optical signal; and
a nonlinear positive dispersion fiber configured to receive the negatively chirped optical signal, wherein the amplifying device amplifies each wavelength channel to a level sufficient to cause self-phase modulation of each wavelength channel in the nonlinear positive dispersion fiber.

2. A dispersion compensating device for an optical signal having a plurality of wavelength channels lying within a wavelength range, the dispersion compensating device comprising:
a negative dispersion fiber having an input configured to receive the optical signal, the negative dispersion fiber having a length and dispersion sufficient to remove any positive chirp from each wavelength channel of the optical signal, thereby outputting a negatively chirped optical signal;
an amplifying device configured to amplify the negatively chirped optical signal; and
a nonlinear positive dispersion fiber configured to receive the negatively chirped optical signal, wherein the amplifying device amplifies each wavelength channel to a level sufficient to cause self-phase modulation of each wavelength channel in the nonlinear positive dispersion fiber, wherein the nonlinear positive dispersion fiber has an effective area of less than about 35 µm$^2$, and has a dispersion more positive than about 8 ps/nm/km.

3. The dispersion compensating device of claim 2 wherein the negative dispersion fiber has a dispersion more negative than about −50 ps/nm/km over the wavelength range of the optical signal.

4. The dispersion compensating device of claim 2, wherein the lengths and dispersion properties of the negative dispersion fiber and the nonlinear positive dispersion fiber are chosen such that their total net dispersion is between about −100 ps/nm and about 100 ps/nm over the wavelength range of the optical signal.

5. The dispersion compensating device of claim 2 wherein the amplifying device is a discrete amplifier operatively positioned between the negative dispersion fiber and the nonlinear positive dispersion fiber.

6. The dispersion compensating device of claim 5, further comprising a wavelength-dependent attenuator operatively positioned between the discrete amplifier and the nonlinear positive dispersion fiber.

7. A dispersion compensating device for an optical signal having a plurality of wavelength channels lying within a wavelength range, the dispersion compensating device comprising:
a negative dispersion fiber having an input configured to receive the optical signal, the negative dispersion fiber having a length and dispersion sufficient to remove any positive chirp from each wavelength channel of the optical signal, thereby outputting a negatively chirped optical signal;
an amplifying device configured to amplify the negatively chirped optical signal; and
a nonlinear positive dispersion fiber to receive the negatively chirped optical signal, wherein the amplifying device is a Raman pump source operatively coupled to the nonlinear positive dispersion fiber, the Raman pump source being configured to amplify the optical signal in the nonlinear positive dispersion fiber.

8. The dispersion compensating device of claim 7, further comprising an isolator operatively positioned between the negative dispersion fiber and the nonlinear positive dispersion fiber, the isolator being configured to block the propagation of Raman pump power from the nonlinear positive dispersion fiber to the negative dispersion fiber.

9. The dispersion compensating device of claim 7, wherein the amplifying device amplifies each wavelength channel to a level of at least about 5 mW.

10. The dispersion compensating device of claim 2, wherein each wavelength channel is output from the nonlinear positive dispersion fiber with a pulse width of less than the bit period of the optical signal.

11. The dispersion compensating device of claim 2, further comprising a dispersion decreasing fiber coupled to the output of the nonlinear positive dispersion fiber.

12. The dispersion compensating device of claim 2, further comprising a gain flattening filter operatively coupled to the output of the nonlinear positive dispersion fiber.

13. The dispersion compensating device of claim 12, further comprising a dispersion decreasing fiber operatively coupled between the nonlinear positive dispersion fiber and the gain flattening filter.

14. The dispersion compensating device of claim 12, wherein the lengths and dispersion properties of the negative dispersion fiber, the nonlinear positive dispersion fiber, and the dispersion decreasing fiber are chosen such that their total net dispersion is between about −100 ps/nm and about 100 ps/nm over the wavelength range of the optical signal.

15. The dispersion compensating device of claim 2, further comprising a wavelength-dependent attenuator configured to operate on the optical signal before it is amplified by the amplifying device.

16. An optical communications system for an optical signal having a plurality of wavelength channels lying within a wavelength range, the optical communications system comprising:
   a negative dispersion fiber having an input configured to receive the optical signal, the negative dispersion fiber having a length and dispersion sufficient to remove any positive chirp from each wavelength channel of the optical signal, thereby outputting a negatively chirped optical signal;
   an amplifying device configured to amplify the negatively chirped optical signal;
   a nonlinear positive dispersion fiber configured to receive the negatively chirped optical signal, wherein the amplifying device amplifies each wavelength channel to a level sufficient to cause self-phase modulation of each wavelength channel in the nonlinear positive dispersion fiber, wherein the nonlinear positive dispersion fiber has an effective area of less than about 35 $\mu m^2$.

17. The optical communications system of claim 16 wherein there exists substantially no transmission fiber operatively coupled between the negative dispersion fiber and the nonlinear positive dispersion fiber.

18. A method for performing dispersion compensation of an optical signal, the optical signal having a plurality of wavelength channels lying within a wavelength range, the method comprising the steps of:
   removing any positive dispersion from each wavelength channel of the optical signal, thereby forming a negatively chirped optical signal;
   amplifying the negatively chirped optical signal; and
   propagating the negatively chirped optical signal in a nonlinear positive dispersion fiber, wherein the nonlinear positive dispersion fiber has an effective area of less than about 35 $\mu m^2$.

19. The method of claim 18 wherein the step of removing any positive dispersion is performed by propagating the optical signal through a negative dispersion fiber having a length and dispersion sufficient to remove any positive chirp from each wavelength channel of the optical signal.

20. The method of claim 18 wherein the step of amplifying the negatively chirped optical signal is performed by propagating the optical signal through a discrete amplifier.

21. The method of claim 18 wherein the step of amplifying the negatively chirped optical signal is performed by propagating the optical signal through the nonlinear positive dispersion fiber and Raman pumping the nonlinear positive dispersion fiber.

* * * * *